United States Patent
Honda

(10) Patent No.: US 12,175,128 B2
(45) Date of Patent: Dec. 24, 2024

(54) NONVOLATILE STORAGE DEVICE, HOST, AND METHOD OF CONTROLLING NONVOLATILE STORAGE DEVICE

(71) Applicant: Kioxia Corporation, Tokyo (JP)

(72) Inventor: Keigo Honda, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 169 days.

(21) Appl. No.: 17/940,741

(22) Filed: Sep. 8, 2022

(65) Prior Publication Data

US 2023/0305749 A1    Sep. 28, 2023

(30) Foreign Application Priority Data

Mar. 22, 2022    (JP) ................. 2022-046003

(51) Int. Cl.
G06F 3/06    (2006.01)

(52) U.S. Cl.
CPC .......... *G06F 3/0659* (2013.01); *G06F 3/0607* (2013.01); *G06F 3/0679* (2013.01)

(58) Field of Classification Search
CPC ..... G06F 3/0607; G06F 3/0659; G06F 3/0679
See application file for complete search history.

(56) References Cited

U.S. PATENT DOCUMENTS

| | | | |
|---|---|---|---|
| 9,361,408 B2 | 6/2016 | Marukame et al. | |
| 9,953,107 B2 | 4/2018 | Marukame et al. | |
| 10,387,302 B2 | 8/2019 | Qui et al. | |
| 10,579,683 B2 | 3/2020 | Marukame et al. | |
| 2015/0229613 A1 | 8/2015 | Baum et al. | |
| 2015/0331619 A1 | 11/2015 | Zheng et al. | |
| 2017/0031959 A1* | 2/2017 | Zayas | G06F 16/1727 |
| 2018/0253386 A1* | 9/2018 | Qiu | G06F 13/1668 |
| 2020/0159629 A1 | 5/2020 | Zhang et al. | |
| 2020/0409915 A1* | 12/2020 | Agrawal | G06F 16/215 |
| 2021/0216220 A1* | 7/2021 | Kim | G06F 3/0656 |
| 2021/0303171 A1 | 9/2021 | Chen et al. | |
| 2021/0334409 A1* | 10/2021 | Weintraub | G06F 21/64 |

FOREIGN PATENT DOCUMENTS

JP    5524144 B2    6/2014

OTHER PUBLICATIONS

Im, J., et al., "Pink: High-Speed In-storage Key-value Store with Bounded Tails," In Proceedings of the 2020 USENIX Annual Technical Conference on File and Storage Technologies, pp. 173-187, Jul. 15-17, 2020 (16 pages).
NVM Express, "NVM Express Key Value Command Set Specification," Revision 1.0, May 18, 2021 (23 pages).

* cited by examiner

*Primary Examiner* — Eric T Oberly
(74) *Attorney, Agent, or Firm* — Foley & Lardner LLP

(57) ABSTRACT

According to one embodiment, there is provided a nonvolatile storage device including a storage medium and a controller. The storage medium is configured to store a key-value pair in which a key and a value form a pair. The controller is configured to generate identification information identifying the key and transmit the identification information to a host.

20 Claims, 15 Drawing Sheets

| KEY ID | USER KEY |
|---|---|
| 00 | User_Key2 |
| 01 | User_Key222 |

222-1 → row 1
222-2 → row 2

| ACCESS KEY | | LOGICAL ADDRESS |
|---|---|---|
| KEY ID | COMPRESSED KEY | |
| 00 | XXXX | 00000000 |
| 00 | YYYY | 00010000 |
| 00 | ZZZZ | 00020000 |
| 01 | ZZZZ | 00030000 |

117
118 | 231a | 804

1132-1 → row 1
1132-2 → row 2
1132-3 → row 3
1132-4 → row 4

FIG.11

| | LOGICAL ADDRESS | PHYSICAL ADDRESS |
|---|---|---|
| 1133-1 | 00000000 | 10001000 |
| 1133-2 | 00010000 | 20002000 |
| 1133-3 | 00020000 | 30003000 |
| 1133-4 | 00030000 | 40004000 |

901 = LOGICAL ADDRESS column; 902 = PHYSICAL ADDRESS column; 900

FIG.12

| PHYSICAL ADDRESS | USER KEY | USER VALUE | |
|---|---|---|---|
| 10001000 | User_Key0 | User_Value0 | 132-1 |
| 20002000 | User_Key1 | - | 132-2 |
| 30003000 | User_Key2 | User_Value2 | 132-3 |
| 40004000 | User_Key222 | User_Value222 | 132-4 |

1001, 1002, 1003; 130

NONVOLATILE STORAGE DEVICE, HOST, AND METHOD OF CONTROLLING NONVOLATILE STORAGE DEVICE

CROSS-REFERENCE TO RELATED APPLICATIONS

This application is based upon and claims the benefit of priority from Japanese Patent Application No. 2022-046003, filed on Mar. 22, 2022; the entire contents of which are incorporated herein by reference.

FIELD

Embodiments described herein relate generally to a nonvolatile storage device, a host, and a method of controlling a nonvolatile storage device.

BACKGROUND

In a nonvolatile storage device including nonvolatile memory, a key-value pair, which includes a pair of key and value, may be stored in the nonvolatile memory. In the nonvolatile storage device, it is desirable that the key-value pair can be appropriately stored in the nonvolatile memory.

BRIEF DESCRIPTION OF THE DRAWINGS

FIG. 9 is a diagram illustrating registered items in an access key cache according to the embodiment;

FIG. 10 is a diagram illustrating a data structure of an access key map according to the embodiment;

FIG. 11 is a diagram illustrating a data structure of an address translation map according to the embodiment;

FIG. 12 is a diagram illustrating key-value pairs stored in a nonvolatile memory according to the embodiment;

DETAILED DESCRIPTION

In general, according to one embodiment, there is provided a nonvolatile storage device including a storage medium and a controller. The storage medium is configured to store a key-value pair in which a key and a value form a pair. The controller is configured to generate identification information identifying the key and transmit the identification information to a host.

Exemplary embodiments of a nonvolatile storage device will be explained below in detail with reference to the accompanying drawings. The present invention is not limited to the following embodiments.

Embodiments

A nonvolatile storage device according to an embodiment includes a nonvolatile memory and stores a key-value pair in which a key and a value form a pair into the nonvolatile memory, with inventive processes to appropriately store the key-value pair into the nonvolatile memory.

Figure 1:
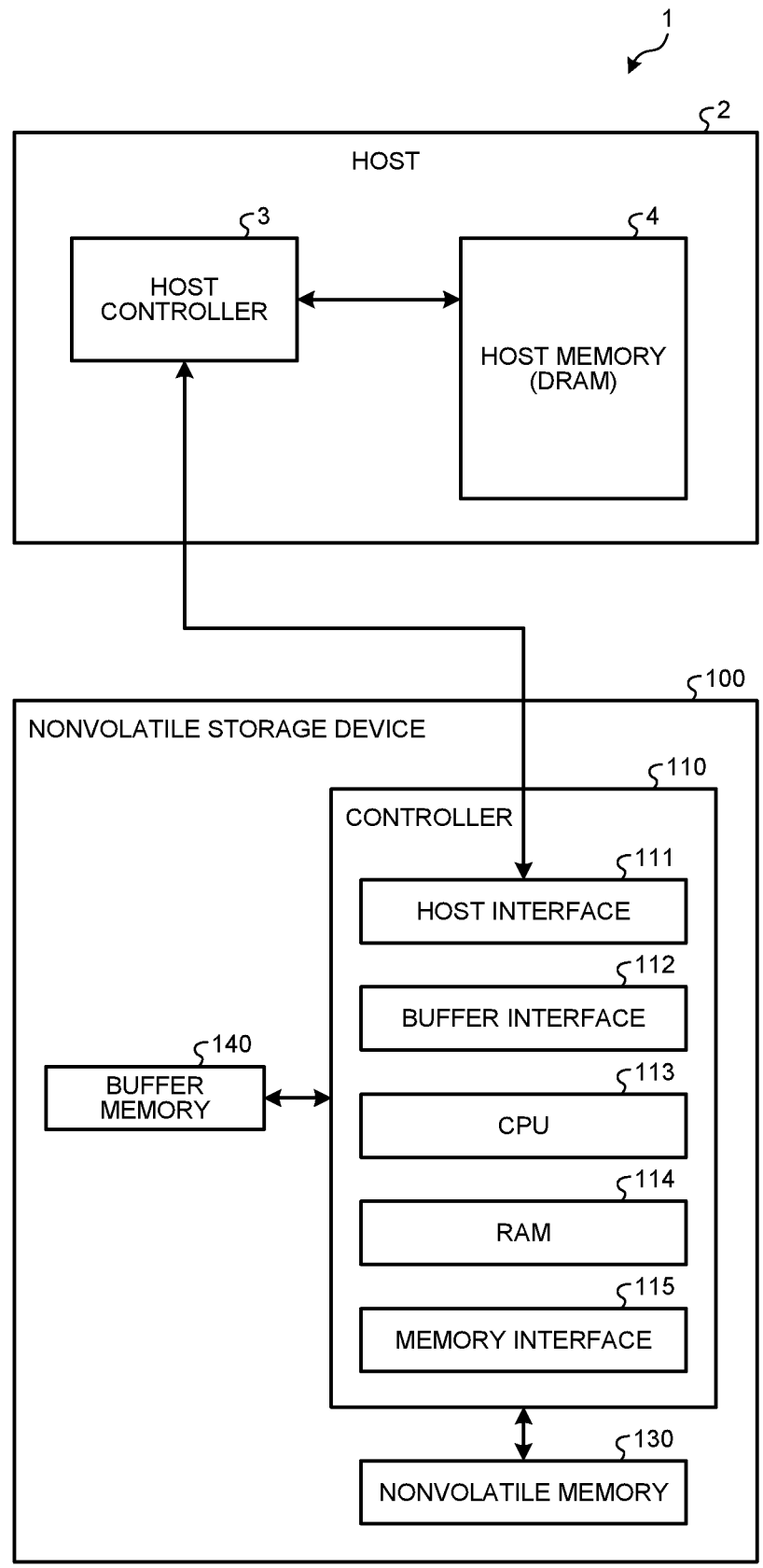
FIG. 1 is a diagram illustrating a hardware configuration of a host and a nonvolatile storage device according to an embodiment.

The information processing system including the nonvolatile storage device can be configured as illustrated in FIG. 1. FIG. 1 is a diagram illustrating a hardware configuration of an information processing system 1 including a nonvolatile storage device 100.

The nonvolatile storage device 100 is communicably connected to a host 2 and functions as an external storage device for the host 2. The nonvolatile storage device 100 can nonvolatilely store data. The nonvolatile storage device 100 may be a device that nonvolatilely stores data by using nonvolatile memory. The nonvolatile storage device 100 may be provided as embedded flash memory conforming to a standard such as a universal flash storage (UFS) standard and an embedded Multi Media Card (eMMC) standard, a solid state drive (SSD), or the like. Alternatively, the nonvolatile storage device 100 may be a device that nonvolatilely stores data by using a disk medium. The nonvolatile storage device 100 may be a hard disk drive (HDD). Examples of the host 2 include a microprocessor, a personal computer, a server, a mobile terminal, an imaging device, and a game device.

Hereinafter, description will be given as an exemplary case where the nonvolatile storage device 100 is a device that nonvolatilely stores data using nonvolatile memory, and the host 2 and the nonvolatile storage device 100 can transmit and receive a signal conforming to a nonvolatile memory express (NVMe) (trademark) standard via a communication channel.

The host 2 includes a host controller 3 and host memory 4. The host controller 3 can be implemented as a System on Chip (SOC). The host controller 3 includes a central processing unit (CPU) and performs processing necessary for issuing a command to the nonvolatile storage device 100.

The nonvolatile storage device 100 includes a controller 110, buffer memory 140, and nonvolatile memory 130. The controller 110 includes a host interface 111, a buffer interface 112, a CPU 113, random access memory (RAM) 114, and a memory interface 115.

The nonvolatile memory 130 can include plural memory chips. Each memory chip has a memory cell array. In the memory cell array of each memory chip, a unit in which collective data access of write and read is possible corresponds to a physical page. A minimum access unit formed with plural physical pages and in which independent data erasure is possible corresponds to a physical block.

The nonvolatile memory 130 is NAND flash memory, for example, but may be other types of nonvolatile semiconductor memory, such as NOR flash memory, Magnetoresistive Random Access Memory (MRAM), Phase Change Memory (PRAM), Resistive Random Access Memory (ReRAM), or Ferroelectric Random Access Memory (FeRAM). The nonvolatile memory 130 may be memory having a three-dimensional structure.

Each of the host controller 3 and the host interface 111 operates according to a protocol defined in the NVMe standard.

The RAM 114 is a piece of memory and functions as a work area for the CPU 113.

The buffer memory 140 functions as a memory region that temporarily stores information. The buffer memory 140 is formed with general-purpose memory such as Static Random Access Memory (SRAM) or Dynamic Random Access Memory (DRAM). The buffer memory 140 may be implemented inside the controller 110, or may be implemented outside the controller 110 independently of the controller 110.

The memory interface 115 is connected to the nonvolatile memory 130 via a bus and controls communication with the nonvolatile memory 130.

The buffer interface 112 is a controller that controls access from the controller 110 to the buffer memory 140, and is a controller that enables access to the buffer memory 140 at a double data rate (DDR), for example. The CPU 113 stores data to be transferred with the nonvolatile memory 130 into the buffer memory 140 as necessary, and transfers data with host memory 4 via the host interface 111.

Figure 2:
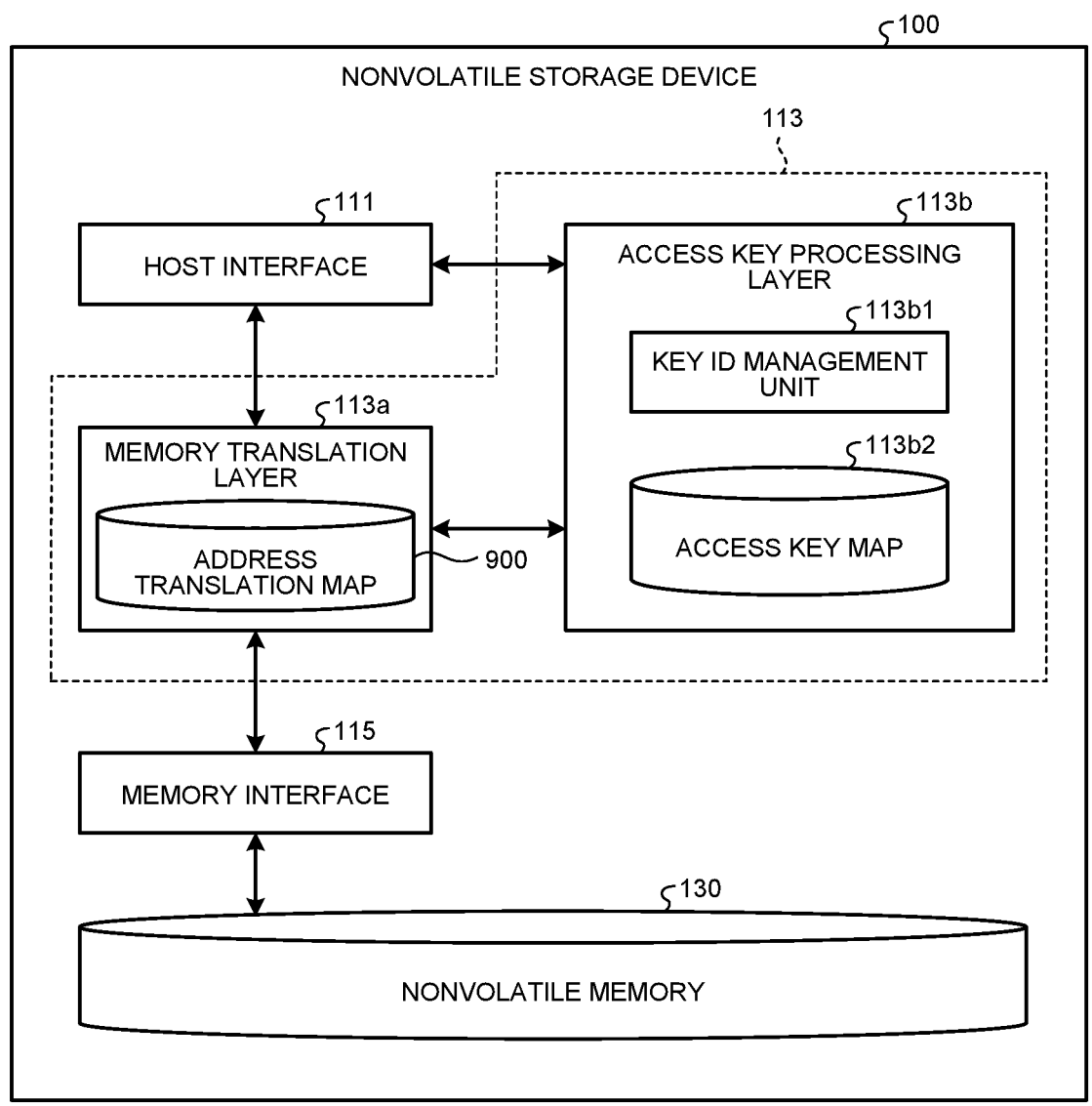
FIG. 2 is a diagram illustrating a configuration of the nonvolatile storage device according to the embodiment.

The CPU 113 integrally controls individual components of the controller 110. As illustrated in FIG. 2, the CPU 113 includes a memory translation layer 113a and an access key processing layer 113b. FIG. 2 is a diagram schematically illustrating a configuration of the nonvolatile storage device 100. The memory translation layer 113a performs format translation of data and the like received from the host interface 111 for the nonvolatile memory 130 and supplies the obtained data to the memory interface 115, and performs format translation of data and the like received from the memory interface 115 for the host 2 and supplies the obtained data to the host interface 111. The memory translation layer 113a includes an address translation map 900. The address translation map 900 includes information in which a logical address and a physical address are associated with each other for plural logical addresses. The memory translation layer 113a translates the logical address associated with data or the like received by the host interface 111 into a physical address by the address translation map 900 and supplies the obtained physical address to the memory interface 115. When the nonvolatile memory 130 is flash memory, the memory translation layer 113a is also referred to as a flash translation layer (FTL). The access key processing layer 113b will be described below.

Figure 3:
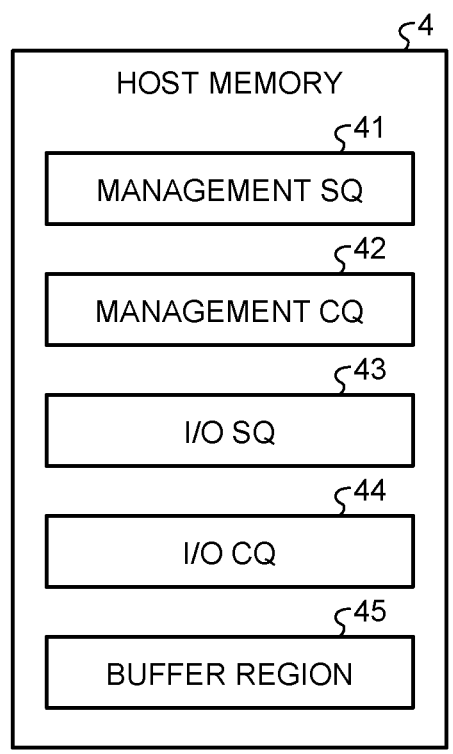
FIG. 3 is a diagram illustrating a configuration of a host memory according to the embodiment.

The host memory 4 included in the host 2 is a memory such as dynamic random access memory (DRAM), for example. As illustrated in FIG. 3, the host memory 4 includes a management submission queue (SQ) 41, a management completion queue (CQ) 42, an I/O SQ 43, an I/O CQ 44, and a buffer region 45. FIG. 3 is a diagram illustrating an example of a configuration of the host memory 4.

The management SQ 41 is a submission queue, and a command is enqueued when a management command is issued. The management CQ 42 is a completion queue, and a completion queue entry (CQE) of the command is enqueued to the management CQ 42 when the management command is completed. The I/O SQ 43 is a submission queue, and a command is enqueued when a command for data I/O is issued. The I/O CQ 44 is a completion queue, and the CQE is enqueued to the I/O CQ 44 when the command for data I/O is completed. The buffer region 45 is used as a buffer in data I/O.

When having issued a command for data I/O, the host 2 enqueues the command in the I/O SQ 43, and notifies the nonvolatile storage device 100 of the command issuance. In response to this, the nonvolatile storage device 100 accesses the I/O SQ 43 of the host 2, acquires the command, and executes the command. In addition, when having completed execution of the command, the nonvolatile storage device 100 accesses the I/O CQ 44 and enqueues the CQE of the command in the I/O CQ 44. By confirming the I/O CQ 44, the host 2 can recognize the completion of the execution of the command.

The submission queue and the completion queue are ring buffers in one example. An entry included in each queue (each of the submission queue and the completion queue) is managed by two variables, namely, a head and a tail. The host 2 or the nonvolatile storage device 100 can identify a reference point (for example, the location of the newly enqueued command information) of each queue based on a location (head pointer and a tail pointer) to which the head and tail point.

The data I/O command is, for example, a store command and a retrieve command, which are included in a key-value command set (KV command set). The store command is a command requesting write of a key-value pair. In a key-value pair, a key and a value form a pair, and the value is associated with the key. The value has a variable length and includes data of a certain size. The retrieve command is a command requesting read of the key-value pair.

For example, the CPU 113 in the nonvolatile storage device 100 writes the key-value pair into the nonvolatile memory 130 in response to the store command. The key-value pair is written to the nonvolatile memory 130 with the value including data associated with the key. The CPU 113 reads the key-value pair from the nonvolatile memory 130 in response to the retrieve command. That is, the value associated with the key is read from the nonvolatile memory 130.

Each command included in the key-value command set can handle data as value of a variable length as compared with a block-format command (for example, a write command and a read command), which makes it unnecessary to perform mapping to a logical block address, leading to efficient command processing.

Figure 4:
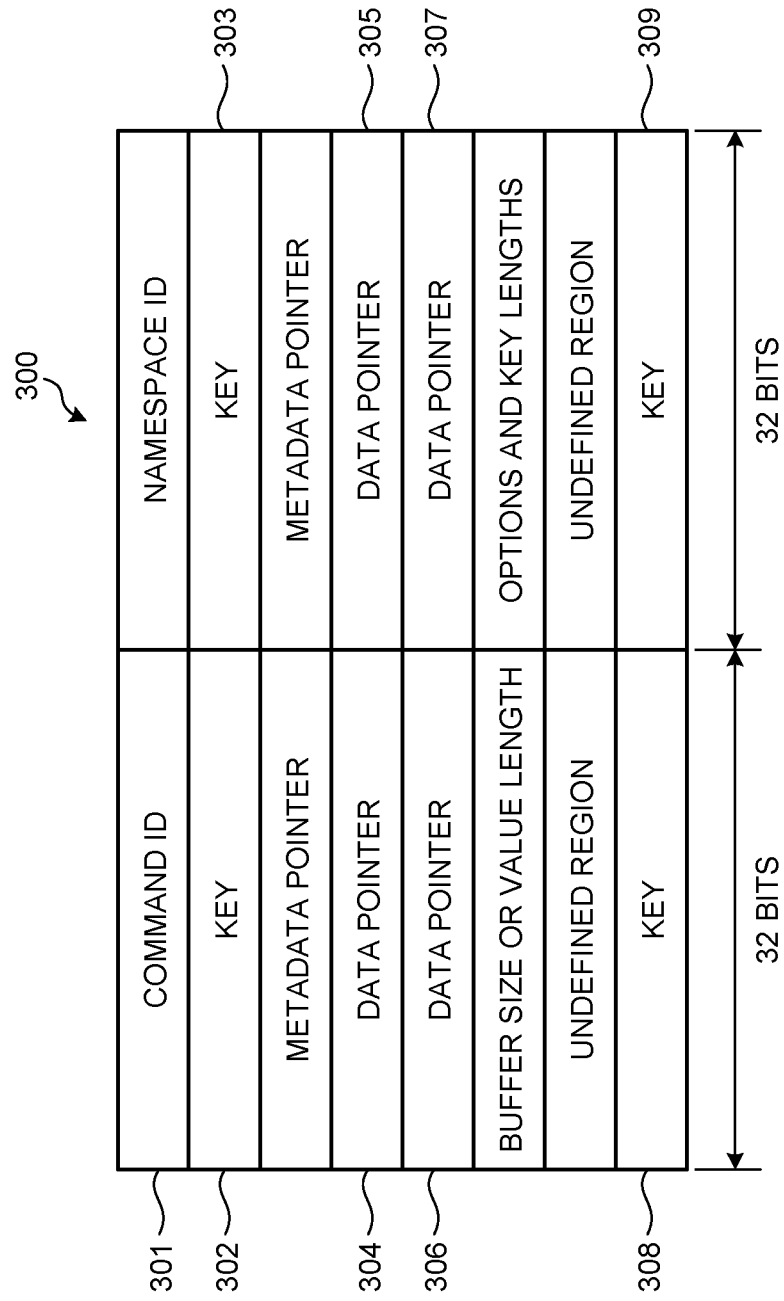
FIG. 4 is a diagram illustrating a field of a Key Value (KV) command according to the embodiment.

Each command (KV command) 300 included in the key-value command set can be defined as illustrated in FIG. 4 according to the NVMe standard. FIG. 4 illustrates an example of a command field of the KV command 300. Each field in the command is composed of 32 bits=4 bytes according to the size of a general-purpose register in the CPU 113. The KV command 300 includes fields such as a command ID 301, keys 302, 303, 308, and 309, and data pointers 304, 305, 306, and 307. The command ID 301 includes an operation code for identifying a store command, a retrieve command, and the like. The keys 302, 303, 308, and 309 are region in which a key in the key-value pair is to be stored, having the size limited by the NVMe standard. For example, the maximum size of the key is limited to 16 bytes according to the NVMe standard. When 16 bytes are divided in units of 4 bytes, each of the four keys 302, 303, 308, and 309 is 32 bits or less, and is limited to 32×4=128 bits in total.

Figure 5:
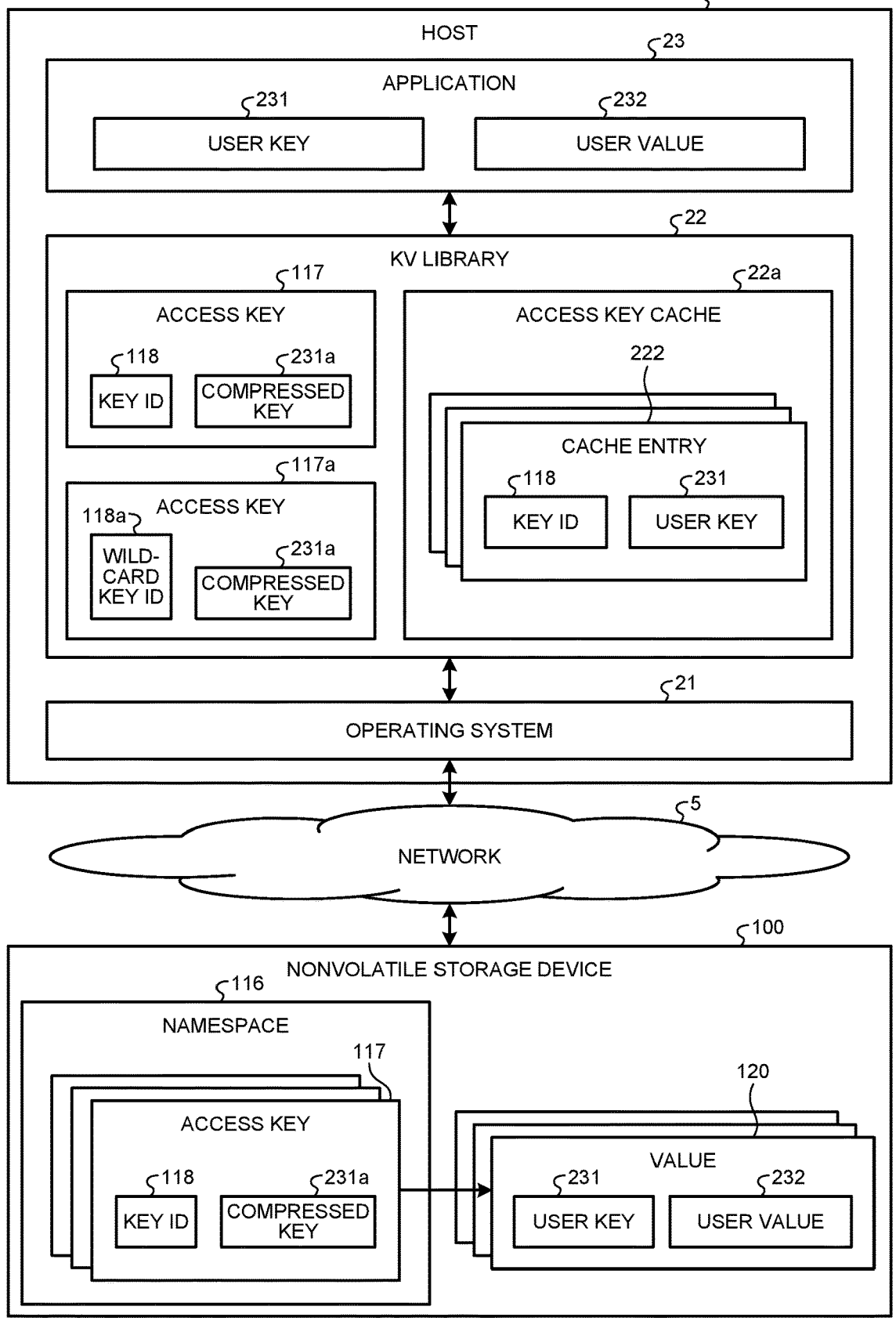
FIG. 5 is a diagram illustrating a functional configuration of the host and the nonvolatile storage device according to the embodiment.

As illustrated in FIG. 5, the host 2 compresses a user key 231 to generate a compressed key 231a. This operation makes it possible to handle keys exceeding the size limit (for example, 128 bits) of the command field of the KV command 300, leading to improvement of the flexibility of the KV command 300. FIG. 5 is a diagram illustrating a functional configuration of the host 2 and the nonvolatile storage device 100. The host 2 issues a KV command 300 (for example, the store command) to enqueue the KV command 300 in the I/O SQ 43, and prepares a value 120 (refer to FIG. 6) in association with the KV command 300. At this time, the host 2 includes the compressed key 231a in the field of the keys 302, 303, 308, and 309 in the KV command 300. In addition, the host 2 includes the user key 231 in the value 120 in addition to a user value 232. The field of the value 120 has a less strict size restriction as compared with the field of the key of the KV command 300. Therefore, the user key 231 can be easily included in the value 120. The host 2 transmits a notification of enqueuing of the KV command 300 to the I/O SQ 43 to the nonvolatile storage device 100 via a network 5.

The nonvolatile storage device 100 has a logically separated region (namespace 116). Within this region, the key in the key-value pair is unique, but depending on the compression algorithm, a compressed key might collide (that is, having the same value) with another compressed key. To handle this, as illustrated in FIG. 2, the access key processing layer 113b in the nonvolatile storage device 100 includes a key ID management unit 113b1 and an access key map 113b2.

When acquiring the KV command 300 and the value 120 from the host 2, the nonvolatile storage device 100 executes the KV command 300 while using the value 120. At the same time, the key ID management unit 113b1 of the access key processing layer 113b refers to the access key map 113b2 including the correspondence between the compressed key 231a and the logical address, and checks whether there is a collision of the compressed key 231a with another compressed key. When there is a collision of the compressed key 231a with another compressed key, the key ID management unit 113b1 generates a flag indicating the occurrence of collision. The key ID management unit 113b1 extracts the user key 231 from the value 120 and generates a key ID (identification information) 118 identifying the user key 231. The key ID management unit 113b1 constructs an access key 117 (refer to FIG. 8) including the key ID 118 and its corresponding compressed key 231a, and adds the access key 117 to the access key map 113b2 (refer to FIG. 10) in association with the logical address.

When having completed the execution of the KV command 300, the nonvolatile storage device 100 illustrated in FIG. 5 transmits a completion queue entry (CQE) 400 (refer to FIG. 7), which is a completion notification of the KV command 300, to the host 2. At this time, the nonvolatile storage device 100 can include the key ID 118 and a flag indicating the occurrence of a collision, in the CQE 400.

The host 2 dequeues the CQE 400 from the I/O CQ 44. The host 2 extracts the key ID 118 from the CQE 400 and constructs the access key 117 together with the corresponding compressed key 231a. This makes it possible for each of the host 2 and the nonvolatile storage device 100 to uniquely specify the associated value 120 by the access key 117 in subsequent command processing.

In addition, the host 2 extracts the flag indicating an occurrence of a collision from the CQE 400, and stores a cache entry 222 into an access key cache 22a according to the flag. This makes it possible for the host 2 to manage collision of the compressed key 231a with another compressed key with reference to the access key cache 22a.

The functional configuration of the host 2 and the nonvolatile storage device 100 will be described in more detail with reference to FIG. 5.

In the information processing system 1, the nonvolatile storage device 100 may be connected to the host 2 via the network 5. The network 5 may be, for example, a network capable of wired communication such as a serial communication line, may be a tree network, or a fabric network. The host 2 performs data communication by issuing a command to the nonvolatile storage device 100 through the network 5.

When it is desired to achieve nonvolatile retention of the user value 232 associated with the user key 231 in the nonvolatile storage device 100, an application 23 supplies a PUT request including the user key 231 and the user value 232 to a KV library 22. The KV library 22 constructs the KV command 300 (for example, the store command) by associating the value 120, which has been constructed with user key 231 and user value 232, with the access key 117. The KV library 22 provides a store command to an operating system 21. When having enqueued the store command in the I/O SQ 43, the operating system 21 transmits a notification of the enqueuing of the store command to the nonvolatile storage device 100 via the network 5.

The configuration of the access key 117 may be implemented in the KV library 22, a kernel layer of the operating system 21, or hardware. The access key 117 is a management key used when accessing data in the nonvolatile storage device 100. Access key 117 includes the key ID 118 and the compressed key 231a. The compressed key 231a is generated by performing data compression on the user key 231 by the host 2. Examples of the methods applied for the compression of the user key 231 include a compression algorithm such as hash calculation.

When the store command is issued, the KV library 22 stores the access key 117 into the fields of the keys 302, 303, 308, and 309 illustrated in FIG. 4 in the store command. The data pointers 304, 305, 306, and 307 store addresses of the values 120 placed in the buffer region 45 (refer to FIG. 3).

In the nonvolatile storage device 100 illustrated in FIG. 5, the host interface 111 (refer to FIG. 2) can acquire the value 120 by DMA transfer from the buffer region 45 (refer to FIG. 3) of the host memory 4 indicated by the data pointers 304, 305, 306, and 307 in the store command. The nonvolatile storage device 100 includes one or more logically separated namespaces 116. When having received the store command, the nonvolatile storage device 100 extracts the compressed key 231a from the store command, and extracts the user key 231 from the corresponding value 120 (refer to FIG. 6). The key ID management unit 113b1 (refer to FIG. 2) confirms duplication of the compressed key 231a with reference to the access key map 113b2 for each namespace 116. When there is duplication of the compressed key 231a, the key ID management unit 113b1 generates the key ID 118 identifying the user key 231. With this operation, in each namespace 116, there is no duplication of the key ID 118 with the compressed key 231a in collision, and there is no duplication of the access key 117 including the key ID 118.

Note that, in a case where there is plural namespaces 116, there may be duplication of the key ID 118 with the compressed key 231a in collision between different namespaces 116. Furthermore, in each namespace 116, there may be duplication of the key ID 118 with the compressed key 231a in no collision.

The nonvolatile storage device 100 stores, into the nonvolatile memory 130, the value 120 including the user key 231 included in the store command and the user value 232, in association with the access key 117, so as to achieve nonvolatile retention. After completion of the storage of the value 120 into the nonvolatile memory 130, the nonvolatile storage device 100 notifies the host 2 of the CQE 400 including the key ID 118.

The host 2 receives the key ID 118 at the time when the store command performed on the nonvolatile storage device 100 is completed. The KV library 22 constructs a cache entry 222 with the received key ID 118 and the corresponding user key 231, and stores the cache entry 222 into the access key cache 22a. The access key cache 22a can be constructed on the host memory 4 by the host controller 3 at the startup of the host 2.

The KV library 22 can acquire the key ID 118 by extracting the key ID 118 from the CQE 400. Having acquired the key ID 118, the KV library 22 determines that there is a collision between the corresponding compressed key 231a with another compressed key, and constructs a cache entry 222 including the key ID 118 and the corresponding user key 231, and caches the constructed cache entry 222 into the access key cache 22a.

The management of the access key cache 22a may be implemented in the KV library 22, a kernel layer of the operating system 21, or hardware. The access key cache 22a is a cache mechanism that stores the key ID 118 corresponding to the user key 231, as the cache entry 222. The access key cache 22a preferentially stores the cache entry 222 having the compressed key 231a in collision. When it is desired to read the user value 232 associated with the user key 231, the application 23 supplies a GET request to the KV library 22. In response to the GET request, the KV library 22 refers to the cache entry 222 in the access key cache 22a.

For example, the KV library 22 accesses the access key cache 22a at a time such as when issuing a command for I/O. When the key ID 118 corresponding to the user key 231 is cached in the access key cache 22a, the KV library 22 constructs the access key 117 including the key ID 118 and its corresponding compressed key 231a. When the key ID 118 corresponding to the user key 231 is not cached in the access key cache 22a, the KV library 22 constructs an access key 117a including a wildcard key ID 118a and the compressed key 231a. The wildcard key ID 118a indicates an arbitrary ID. The wildcard key ID 118a indicates that the corresponding compressed key 231a is in no collision with another compressed key or the first generated compressed key among plural compressed keys in future collision with another compressed key.

When the application 23 reads the user value 232 associated with the user key 231 from the nonvolatile storage device 100, the application 23 supplies a GET request of the user key 231 to the KV library 22. In response to the GET request, the KV library 22 constructs the access key 117 and issues a retrieve command to the nonvolatile storage device 100.

When issuing the retrieve command, the KV library 22 stores the access key 117 in the field of the keys 302, 303, 308, and 309 illustrated in FIG. 4 in the retrieve command. The data pointers 304, 305, 306, and 307 store addresses of regions reserved for value storage in the buffer region 45 (refer to FIG. 3).

The nonvolatile storage device 100 that has acquired the retrieve command retrieves the access key 117 that matches the access key 117 included in the retrieve command, reads the value 120 associated with the access key 117, and transmits the read value 120 to the host 2. The host interface 111 transmits the value 120 corresponding to the access key 117 to a region addressed by the data pointers 304, 305, 306, and 307 using direct memory access (DMA) transfer.

Having receiving the response to the retrieve command, the KV library 22 extracts the user key 231 and the user value 232 from the value 120 and supplies the extracted user value 232 to the application 23.

Figure 6:
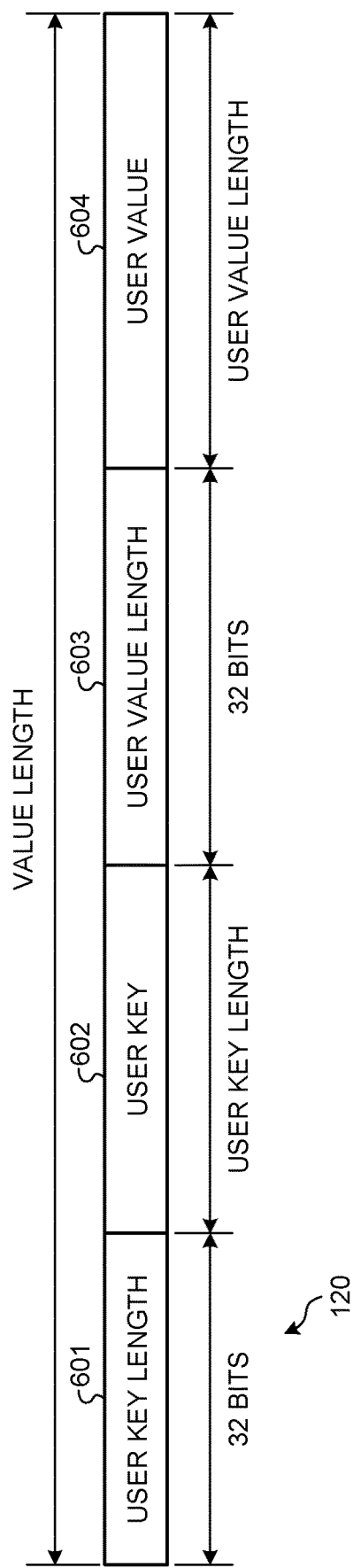
FIG. 6 is a diagram illustrating a field of a value according to the embodiment.

Next, fields of the value 120 will be described with reference to FIG. 6. FIG. 6 is a diagram illustrating fields of the value 120.

The size of the value 120 (value length) is variable and is designated by the KV command 300. As illustrated in FIG. 6, the value 120 includes plural fields such as a user key length column 601, a user key 231 column 602, a user value length column 603, and a user value 232 column 604. It is determined that the size of the field in the user key length column 601 and the user value length column 603 is shorter than the value length of the value 120. The size of each field is limited to 32 bits according to the definition of the field indicating the value length in the NVMe standard. On the other hand, the field in the user key 231 column 602 has a size of a variable length, and a certain size capable of storing the user key 231 can be designated by the field in the user key length column 601. The field of the user value 232 column 604 has a size of a variable length, and a certain size capable of storing the user value 232 can be designated in the field of the user value length column 603.

For example, when issuing a store command, the host 2 constructs the value 120 as illustrated in FIG. 6, and stores the user key 231 and the user value 232, the targets to be written, into the fields of the column 602 of the user key 231 and the column 604 of the user value 232, respectively. At the time of responding to the retrieve command, the nonvolatile storage device 100 constructs the value 120 as illustrated in FIG. 6, and stores the read user key 231 and user value 232 into the field of the user key 231 column 602 and the field of the user value 232 column 604, respectively.

Figure 7:
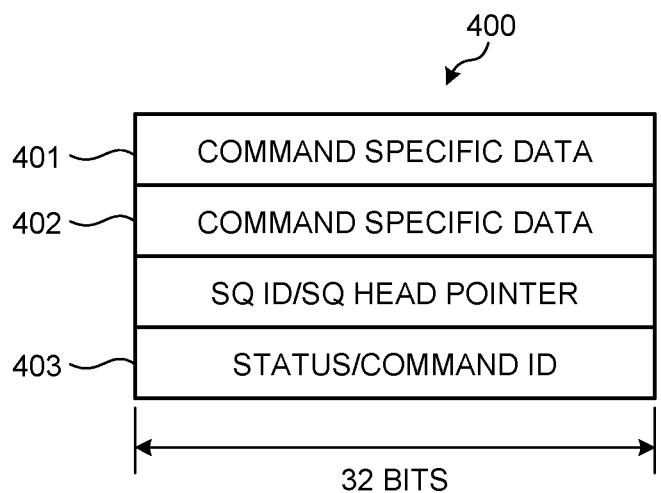
FIG. 7 is a diagram illustrating a field of a Completion Queue Entry (CQE) according to the embodiment.

Next, the field of the completion queue entry (CQE) 400 will be described with reference to FIG. 7. FIG. 7 is a diagram illustrating a field of the completion queue entry (CQE) 400.

The CQE 400 is a command completion notification. The CQE 400 includes fields such as command specific data 401 and 402, and status/command ID 403. The field of the command specific data 401 and 402 can use up to 32×2=64 bits. However, in a case where the command specific data 401 and 402 are extended, it is possible to include the key ID 118 having a data length equal to or longer than the total size (for example, 32×4=128 bits) of the keys 302, 303, 308, and 309 of the KV command 300. The status/command ID 403 can include a flag indicating an occurrence of a collision of the compressed keys 231a, in addition to a status indicating completion or an error of the KV command 300 and an ID for identifying the KV command 300. The status/command ID 403 has a size of 32 bits, for example.

For example, when the key ID 118 is generated by the key ID management unit 113b1, the host interface 111 stores the key ID 118 into the field of the command specific data 401 and 402 of the CQE 400 and stores the flag indicating the occurrence of the collision into the field of the status/command ID 403 of the CQE 400 when notifying the host 2 of the completion of the store command. The host interface 111 notifies the KV library 22 of the CQE 400 through the network 5 and the operating system 21.

Figure 8:
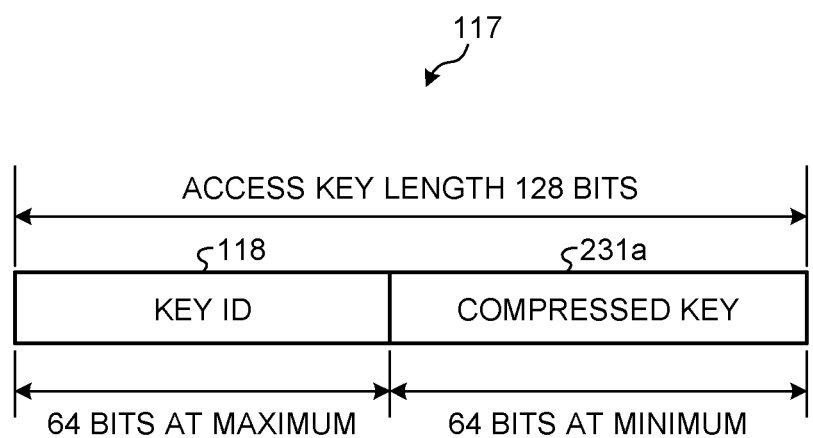
FIG. 8 is a diagram illustrating a field of an access key according to the embodiment.

Next, the access key 117 (refer to FIG. 5) will be described with reference to FIG. 8. FIG. 8 is a diagram illustrating fields of the access key 117.

The size of the access key 117 (access key length) is limited to the total size of the fields of the keys 302, 303, 308, and 309 of the KV command 300 (for example, 32×4=128 bits). As illustrated in FIG. 8, access key 117 includes fields of the key ID 118 and the compressed key 231a. The size of the key ID 118 can be designated to the size up to 64 bits as notified in the command specific data 401, 402 of the CQE 400. Accordingly, for example, a minimum of 64 bits is reserved for the size of compressed key 231a.

Note that it is allowable to take in consideration that the size of the compressed key 231a may change according to the size of the user key 231. The size of 64 bits or more may be reserved for the compressed key 231a, for example, and the size obtained by subtracting the size of the compressed key 231a from the size of the access key 117 may be reserved for the size of the key ID 118.

For the use case of the access key 117, the host interface 111 performs operation of processing for each received KV command 300.

In a case of the store command, the key ID management unit 113b1 generates the key ID 118 in consideration of occurrence of a collision of the compressed key 231a received from the host 2 in the access key map 113b2. The Key ID management unit 113b1 constructs the access key 117 including the generated key ID 118 and the corresponding compressed key 231a. The nonvolatile storage device 100 receives the value 120 including the user key 231 and the user value 232 from the host 2, and stores a logical address in an address space used by the access key processing layer 113b into the access key map 113b2. The memory interface 115 performs non-volatilization by reserving a physical address of the nonvolatile memory 130 indicating a physical write destination to store the value 120 including the user key 231 and the user value 232. The memory translation layer 113a stores a correspondence between the logical address and the physical address.

In a case of the retrieve command, the access key processing layer 113b acquires the logical address storing the value 120 corresponding to the access key 117 from the access key map 113b2, and requests the memory translation layer 113a to read the value 120. The memory translation layer 113a acquires the physical address storing the value 120 from the logical address, and the memory interface 115 reads the value 120 from the physical address. The host interface 111 transmits the read value 120 to the host 2.

Next, registered items of the access key cache 22a (refer to FIG. 5) will be described with reference to FIG. 9. FIG. 9 is a diagram illustrating registered items of the access key cache 22a.

The access key cache 22a is a cache mechanism that stores the key ID 118 corresponding to the user key 231, as the cache entry 222. The access key cache 22a preferentially stores the cache entry 222 having the compressed key 231a in collision. The registered items of the access key cache 22a have a two-dimensional data structure, and includes a column of the key ID 118 and a column of the user key 231. Each row indicates the cache entry 222.

The access key cache 22a is construed on the host memory 4 at the startup of the host 2. Having recognized the occurrence of the collision of the compressed key 231a with the flag in the CQE 400 transmitted from the nonvolatile storage device 100, the host 2 combines the key ID 118 included in the CQE 400 with the corresponding user key 231 to construct the cache entry 222, and registers the cache entry 222 in the access key cache 22a.

The host 2 can grasp the order of occurrence of collisions of the compressed key 231a with reference to the access key cache 22a. In the case of FIG. 9, first, in response to the occurrence of a collision in the compressed key 231a of the user key "User_Key2", a cache entry 222-1 is registered in the access key cache 22a. Next, in response to the occurrence of a collision in the compressed key 231a of the user key "User_Key222", a cache entry 222-2 is registered in the access key cache 22a.

Next, a data structure of the access key map 113b2 will be described with reference to FIG. 10. FIG. 10 is a diagram illustrating the data structure of the access key map 113b2.

The access key map 113b2 is information in which the access key 117 and the logical address are associated with each other regarding one or more access keys. The access key map 113b2 has a two-dimensional data structure and includes a column of the access keys 117 and a logical address column 804. The columns of the access key 117 include a column of the key ID 118 and a column of the compressed key 231a. Each row indicates an entry 1132 for one key-value pair. The logical address column 804 stores the logical address of the storage location of the key-value pair (for example, the logical address of the first bit of the key-value pair).

The access key map 113b2 is constructed on the buffer memory 140 by the access key processing layer 113b at the startup of the nonvolatile storage device 100. In a case where the key-value pair is written to the nonvolatile memory 130, the access key processing layer 113b constructs an entry 1132 with the access key 117 and the logical address to be written, and adds the entry 1132 to the access key map 113b2. In the access key map 113b2, the entries 1132 are listed in the order of write (for example, from an upper row to a lower row).

When reading the value 120 stored in the nonvolatile memory 130, the access key processing layer 113b refers to the column 804 of the logical address from the column of the access key 117, and selects the corresponding logical address, and then, the memory translation layer 113a performs address translation on the logical address using the address translation map 900 and reads the value 120 from the physical address obtained by the translation.

In the case of FIG. 10, the upper three entries 1132-1 to 1132-3 have key ID 118 of "00" in common, but have different compressed keys 231a such as "XXXX", "YYYY", and "ZZZZ". That is, while there is no occurrence of duplication of the compressed key 231a, the key ID management unit 113b1 may take over and apply the previously allocated value to the key-value pair, as the key ID 118. With this application, the entries 1132-1 to 1132-3 will have access keys which are different and can be distinguished from each other, such as "00XXXX", "00YYYY", and "00ZZZZ", and thus, the entries can be stored in logical addresses "00000000", "00010000", and "00020000" with mutually different key-value pairs.

On the other hand, the lower two entries 1132-3 to 1132-4 have different key ID 118 of "00" or "01", and have duplicated compressed keys 231a of "ZZZZ" and "ZZZZ". That is, when the duplication of the compressed key 231a occurs, the key ID management unit 113b1 applies a value different from the value previously allocated to the key-value pair, as the key ID 118. With this application, the entries 1132-3 to 1132-4 will have access keys which are different from each other and can be distinguished from each other, such as "00ZZZZ", and "01ZZZZ", and thus, the entries can be stored in logical addresses "00020000", and "00030000" with mutually different key-value pairs. That is, since the user keys 231 are different, different key IDs 118 are allocated, the entries can be distinguished from each other even with the same compressed keys 231*a*.

Next, a data structure of the address translation map 900 will be described with reference to FIG. 11. FIG. 11 is a diagram illustrating the data structure of the address translation map 900.

The address translation map 900 is information in which logical addresses and physical addresses are associated with each other for one or more logical addresses. The address translation map 900 has a two-dimensional data structure and includes a logical address column 901 and a physical address column 902. Each row indicates an entry 1133 for one key-value pair. The physical address column 902 stores a physical address of a storage location of the key-value pair in the nonvolatile memory 130 (for example, the physical address of the first bit of the key-value pair).

Note that, in a case where the logical address is sequential but the physical address is non-sequential with respect to each bit of the key-value pair, the key-value pair may be divided in units of sequential physical addresses and each may be constructed as the entry 1133.

The address translation map 900 is constructed on the buffer memory 140 by the memory translation layer 113*a* at the startup of the nonvolatile storage device 100.

When writing the key-value pair to the nonvolatile memory 130, the memory translation layer 113*a* constructs an entry 1133 using the logical address of the key-value pair and the physical address allocated to the logical address, and adds the entry 1133 to the address translation map 900.

For example, when storing the key-value pair of the logical address "00000000" into the physical address "10001000", the memory translation layer 113*a* adds an entry 1133-1 including the logical address "00000000" and the physical address "10001000" to the address translation map 900. When storing the key-value pair of the logical address "00030000" in the physical address "40004000", the memory translation layer 113*a* adds an entry 1133-4 including the logical address "00030000" and the physical address "40004000" to the address translation map 900.

When reading the value 120 stored in the nonvolatile memory 130, the memory translation layer 113*a* refers to the column of physical addresses 902 from the column of logical address 901 of the address translation map 900, selects the corresponding physical address, and reads the value from the physical address obtained by the translation.

Note that the correspondence between the logical address and the physical address can be updated by garbage collection or wear leveling processes executed by the nonvolatile storage device 100.

Next, key-value pairs stored in the nonvolatile memory 130 will be described with reference to FIG. 12. FIG. 12 is a diagram illustrating key-value pairs stored in the nonvolatile memory 130.

FIG. 12 conceptually illustrates key-value pairs stored in the nonvolatile memory 130. In FIG. 12, a column 1001 indicates a physical address, a column 1002 indicates a user key 231, a column 1003 indicates a user value 232, and each row indicates one key-value pair.

For example, the memory region starting from a physical address "10001000" stores a key-value pair 132-1 including a user key "User_Key0" and a user value "User_Value0". The memory region starting from a physical address "20002000" stores a key-value pair 132-2 including a user key "User_Key1" and a user value "–(null)". The user value "–(null)" has a data length of 0, but can be treated as a valid value indicating some information with null. The memory region starting from a physical address "30003000" stores a key-value pair 132-3 including a user key "User_Key2" and a user value "User_Value2". The memory region starting from a physical address "40004000" stores a key-value pair 132-4 including a user key "User_Key222" and a user value "User_Value222".

In the information processing system 1 illustrated in FIG. 5, the user key 231 having a variable length can be handled in the command field of the KV command 300 (refer to FIG. 4) and the field of the CQE 400 (refer to FIG. 7). The command field of the KV command 300 has a fixed length, and thus, cannot directly handle the user key 231 having a variable length. Therefore, the user key 231 is uniquely managed by the compressed key 231*a* having a fixed length generated from the user key 231 and the key ID 118 generated by the nonvolatile storage device 100. For example, using a hash value as the compressed key 231*a* would involve an occurrence of a collision problem of the hash value with a low probability. This collision problem can be solved by allocating a different key ID 118. In addition, the correspondence between the access key 117 and the user key 231 can be ensured by managing the correspondence between the access key 117 and the user key 231 by the nonvolatile storage device 100.

Furthermore, the information processing system 1 provides an efficient functionality of sharing the key ID 118 with the host 2, which is necessary when the nonvolatile storage device 100 generates the key ID 118. When there is no collision of the compressed key 231*a*, the nonvolatile storage device 100 can identify the user key 231 with the compressed key 231*a* even when the KV library 22 does not designate the key ID 118. Therefore, the KV library 22 preferentially caches the key ID 118 corresponding to the user key 231 colliding with the compressed key 231*a*, in the access key cache 22*a*. At this time, since the collision is notified to the KV library 22 at the timing of completion of the processing of the store command, the key ID 118 of the user key 231 in collision for which the processing of the store command has been completed first has not been cached. However, since the order of addition to the access key map 113*b*2 can be managed by the key ID management unit 113*b*1, the KV library 22 can perform data access by designating the wildcard key ID as the key ID.

Figure 13:
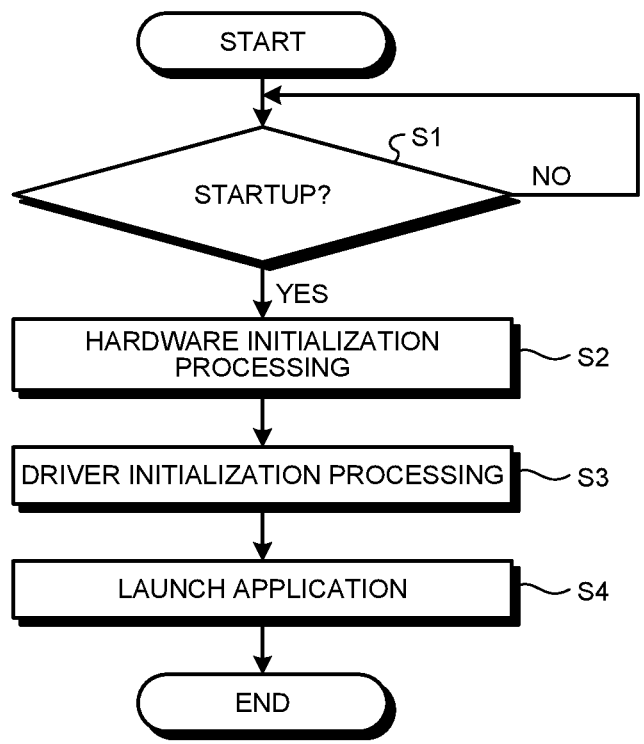
FIG. 13 is a flowchart illustrating startup processing of an information processing system according to the embodiment.

Next, an operation at the time of startup of the information processing system 1 will be described with reference to FIG. 13. FIG. 13 is a flowchart illustrating startup processing of the information processing system 1.

The information processing system 1 waits until being started up (No in S1), and performs hardware initialization processing (S2) after startup (Yes in S1). In the hardware initialization processing, a method of generating the key ID 118 is set for each namespace 116 of the nonvolatile storage device 100 in addition to normal initialization setting. For example, the method of generating the key ID 118 may be a generation method in which 00 is to be set as an initial value in a 2-digit format in hexadecimal notation and the value is incremented from 00 to make the value different from the initial value. The information processing system 1 performs driver initialization processing (S3). When the key ID 118 is generated by the driver, the driver initialization processing includes the setting of a method of generating the compressed key 231*a* (compression algorithm) in addition to the normal initialization setting. The information processing system 1 launches the application 23 (S4).

Figure 14:
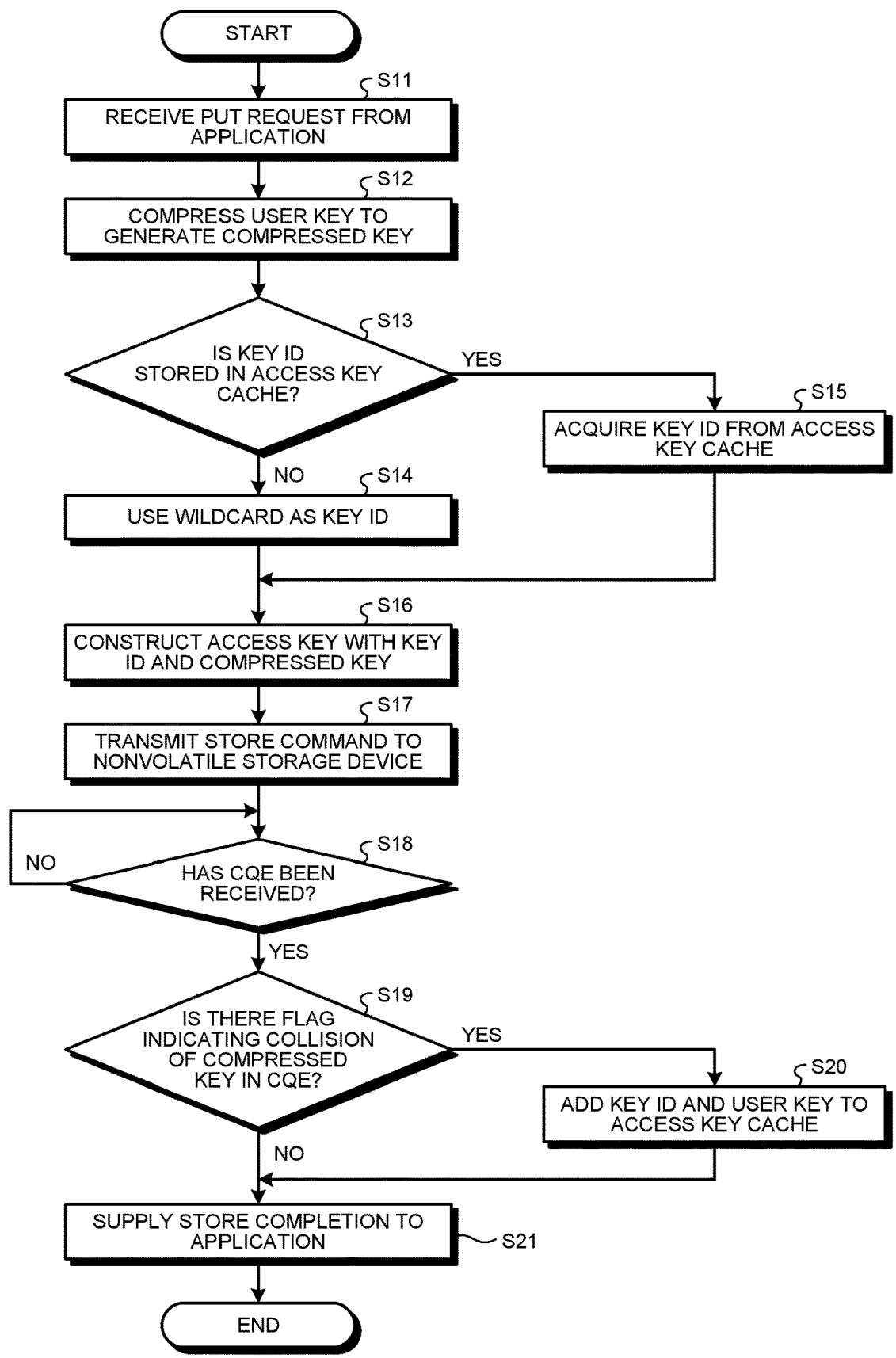
FIG. 14 is a flowchart illustrating operations of the host related to a store command according to the embodiment.

Next, operations of the host 2 related to the store command will be described with reference to FIG. 14. FIG. 14 is a flowchart illustrating operations of the host 2 related to the store command.

In host 2, when having received a PUT request from the application 23 (S11), the KV library 22 extracts the user key 231 from the PUT request, and generates the compressed key 231a using the compression algorithm set in S3 (S12). This compression algorithm can be designated to perform hash calculation and the like. The KV library 22 determines whether the user key 231 received in the PUT request in S11 is stored in the user key column 702 of the access key cache 22a (S13).

When the user key 231 is not stored in the user key column 702 of the access key cache 22a (No in S13), the KV library 22 uses a wildcard key ID for the key ID 118 (S14).

When the user key 231 is stored in the user key column 702 of the access key cache 22a (Yes in S13), the KV library 22 reads the cache entry 222 from the access key cache 22a and acquires the key ID 118 included in the cache entry 222 (S15).

The KV library 22 constructs the access key 117 using the key ID 118 designated in S14 or S15 and the compressed key 231a generated in S12 (S16). The KV library 22 constructs the command field (refer to FIG. 4) of the store command using the access key 117, and transmits the store command to the nonvolatile storage device 100 via the operating system 21 (S17). That is, the operating system 21 enqueues the store command to the I/O SQ 43 and transmits a notification of the enqueue to the nonvolatile storage device 100.

The KV library 22 waits until reception of the CQE 400 indicating the completion of the store command from the nonvolatile storage device 100 via the operating system 21 (No in S18). When the KV library 22 has received the CQE 400 from the nonvolatile storage device 100 via the operating system 21 (Yes in S18), the operating system 21 dequeues the CQE 400 from the I/O CQ 44 and notifies the KV library 22 of the CQE 400. The KV library 22 determines whether the CQE 400 includes a flag indicating the collision of the compressed key (S19).

When the CQE 400 includes the flag indicating a collision of the compressed key 231a (Yes in S19), the KV library 22 acquires the key ID 118 included in the CQE 400, and constructs the cache entry 222 including the key ID 118 and the user key 231. The KV library 22 adds the cache entry 222 to the access key cache 22a (S20). At this time, the KV library 22 may update the access key cache 22a by reading, from the nonvolatile storage device 100, the user key 231 of which the store operation has been completed before the store command and being in collision with the compressed key 231a but has not been cached in the access key cache 22a, and by reading the key ID 118 for identifying the user key 231. The KV library 22 notifies the application 23 of completion of the processing performed in response to the PUT request (S21).

When the flag indicating the collision of the compressed key 231a is not included in the CQE 400 (No in S19), the KV library 22 notifies the application 23 that the process in response to the PUT request has been completed without constituting the cache entry 222 (S21).

Figure 15:
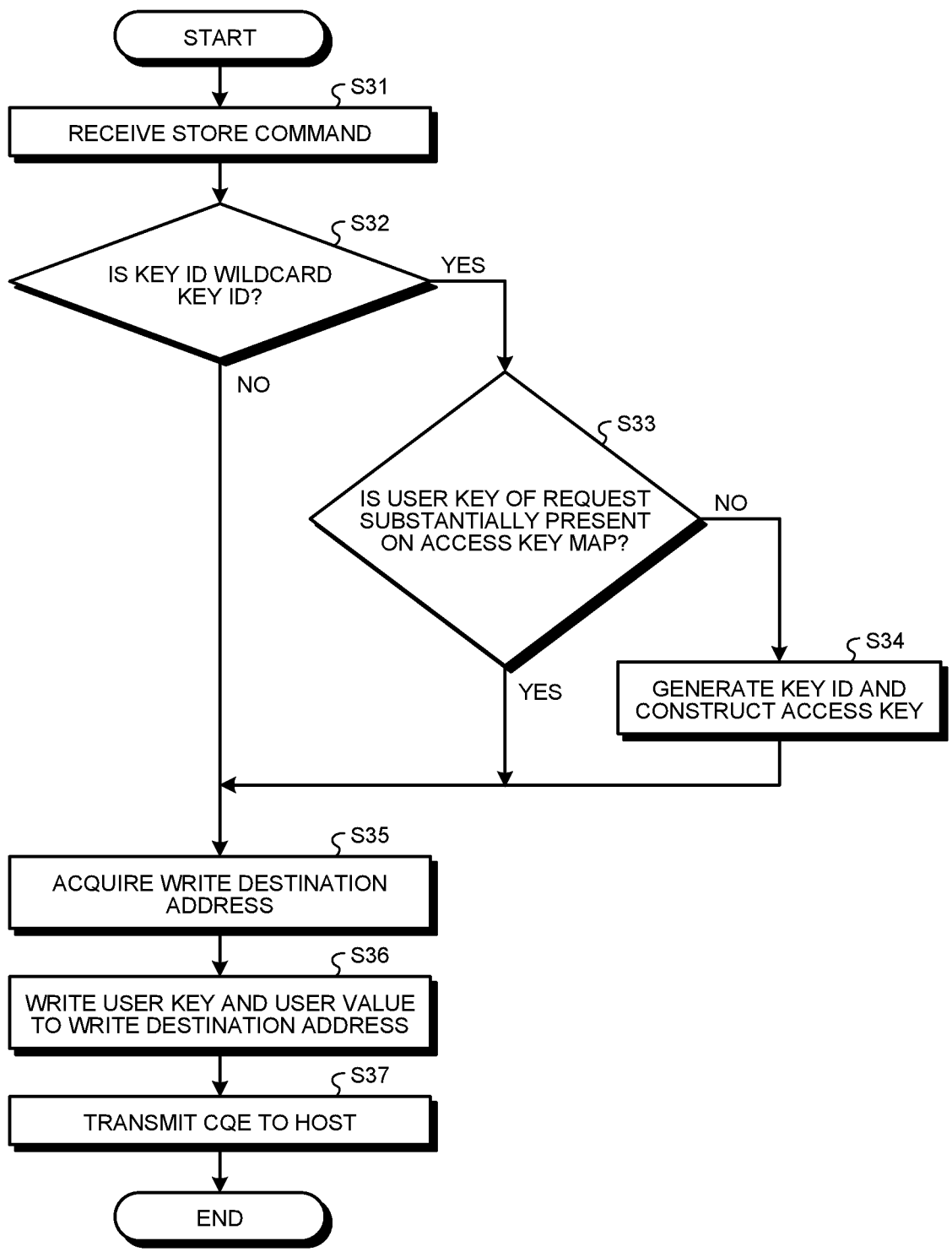
FIG. 15 is a flowchart illustrating operations of the nonvolatile storage device regarding the store command according to the embodiment.

Next, operations of the nonvolatile storage device 100 related to the store command will be described with reference to FIG. 15. FIG. 15 is a flowchart illustrating operations of the nonvolatile storage device 100 regarding the store command.

In the nonvolatile storage device 100, when having received a store command from the host 2 (S31), the controller 110 determines whether the key ID 118 is a wildcard ID (S32). The controller 110 extracts the key ID 118 from the access key 117 (refer to FIG. 8) obtained from the fields of the key 302, 303, 308, and 309 of the store command.

When the extracted key ID 118 is a wildcard key ID (for example, "FF" in hexadecimal notation) (Yes in S32), the controller 110 determines whether the user key 231 requested by the store command substantially exists on the access key map 113b2 (S33). Although the user key 231 does not explicitly exist on the access key map 113b2, the controller 110 manages the correspondence between the user key 231 and the access key 117. Therefore, the controller 110 can determine whether the user key 231 requested by the store command substantially exists on the access key map 113b2.

The controller 110 extracts the user key 231 from the field (refer to FIG. 6) in the column 602 of the user key 231 having the value 120 designated by the store command. The controller 110 refers to the access key map 113b2 (refer to FIG. 10). The controller 110 lists plural user keys 231 corresponding to the plural access keys 117 on the access key map 113b2. The controller 110 determines whether there is a user key 231 that matches the user key 231 requested by the store command among the plural listed user keys 231.

When there is a matching user key 231 (Yes in S33), the controller 110 determines that no collision occurs. For example, when the access key "00XXXX" exists at the time of storing with respect to the previously stored user key 231, it is determined that the current store corresponds to the write with overwrite and that no collision occurs (refer to FIG. 10).

When there is no matching user key 231 (No in S33), the controller 110 can determine that a collision will occur. For example, in a case where "User_Key2" does not exist among the plural listed user keys 231 at the time of storing a certain compressed key (for example, ZZZZ obtained by compressing User_Key2), it can be determined that a collision occurs assuming that the current store is the first write of the user key "User_Key2" (refer to FIGS. 9 and 10). Alternatively, when "User_Key 222" does not exist among the plural listed user keys 231 at the time of storing the user key (for example, ZZZZ obtained by compressing User_Key 222) with collision of the compressed key, it can be determined that the collision occurs assuming that the current store is the first write of the user key "User_Key 222" (refer to FIGS. 9 and 10).

When the user key 231 requested by the store command does not substantially exist on the access key map 113b2 (No in S33), the controller 110 generates a flag indicating the occurrence of a collision, generates the key ID 118, and constructs the access key 117 (S34). The controller 110 refers to the access key map 113b2 (refer to FIG. 10) and specifies the key ID 118 corresponding to the same compressed key 231a as the compressed key 231a requested by the store command. The controller 110 generates a key ID 118 different from the specified key ID 118 as the key ID 118 corresponding to the compressed key 231a requested by the store command. The controller 110 may increment the value of the specified key ID 118 and generate the key ID 118 with the incremented value. The controller 110 constructs the access key 117 including the generated key ID 118 and the compressed key 231a requested by the store command, and allocates a logical address to the access key 117. The controller 110 constructs an entry 1132 with the access key 117 and its corresponding logical address, and adds the entry 1132 to update the access key map 113b2.

For example, when the compressed key "ZZZZ" is extracted in S33, the controller 110 refers to the access key map 113b2 in a state where the entry 1132-4 illustrated in FIG. 10 is absent, and determines that the same compressed key "ZZZZ" as the extracted compressed key "ZZZZ" exists in the entry 1132-3 and there is an occurrence of a collision of the compressed key "ZZZZ". Based on this, the controller 110 specifies the key ID "00" of the entry 1132-3 as the key ID 118 corresponding to the same compressed key "ZZZZ" as the extracted compressed key "ZZZZ". The controller 110 may generate the key ID 118 having a value "01" obtained by incrementing "00" as the key ID 118 corresponding to the compressed key "ZZZZ" extracted in S33. The controller 110 constructs the access key 117 including the key ID "01" and the compressed key "ZZZZ". The controller 110 allocates a logical address to the access key 117, constructs an entry 1132-4 with the access key 117 and the logical address, and adds the entry 1132-4 to update the access key map 113b2.

When the extracted key ID is not a wildcard key ID (No in S32), the controller 110 determines that the key ID has already been generated and allocates a logical address to the access key 117 included in the store command. The controller 110 constructs an entry 1132 with the access key 117 and the logical address, and adds the entry 1132 to update the access key map 113b2.

When the user key 231 requested by the store command substantially exists on the access key map 113b2 (Yes in S33), the controller 110 allocates a logical address to the access key 117 included in the store command. The controller 110 constructs an entry 1132 with the access key 117 and the logical address, and adds the entry 1132 to update the access key map 113b2.

The controller 110 acquires a physical address of the write destination of the key-value pair based on the updated access key map 113b2 and the address translation map 900 (S35). The controller 110 refers to the access key map 113b2 and specifies a logical address corresponding to the access key 117 of the key-value pair. The controller 110 refers to the address translation map 900 and specifies a physical address corresponding to the specified logical address. The controller 110 sets the specified physical address as the physical address of the write destination.

The controller 110 issues a write instruction including the acquired physical address and key-value pair to the nonvolatile memory 130. With this operation, the nonvolatile memory 130 writes the user key 231 and the user value 232 to the physical address in response to the write instruction and achieves non-volatilization (S36). After completion of the execution of the write instruction, the nonvolatile memory 130 transmits a completion notification to the controller 110. After receiving the completion notification from the nonvolatile memory 130, the controller 110 generates the CQE 400 as the completion notification of the store command. At this time, when it is determined as No in S33 and it is determined that the collision has occurred, the controller 110 may generate the CQE 400 so as to include the flag indicating the occurrence of the collision generated in S33 and the key ID 118 generated in S34. The controller 110 transmits the generated CQE 400 to the host 2 (S37).

Figure 16:
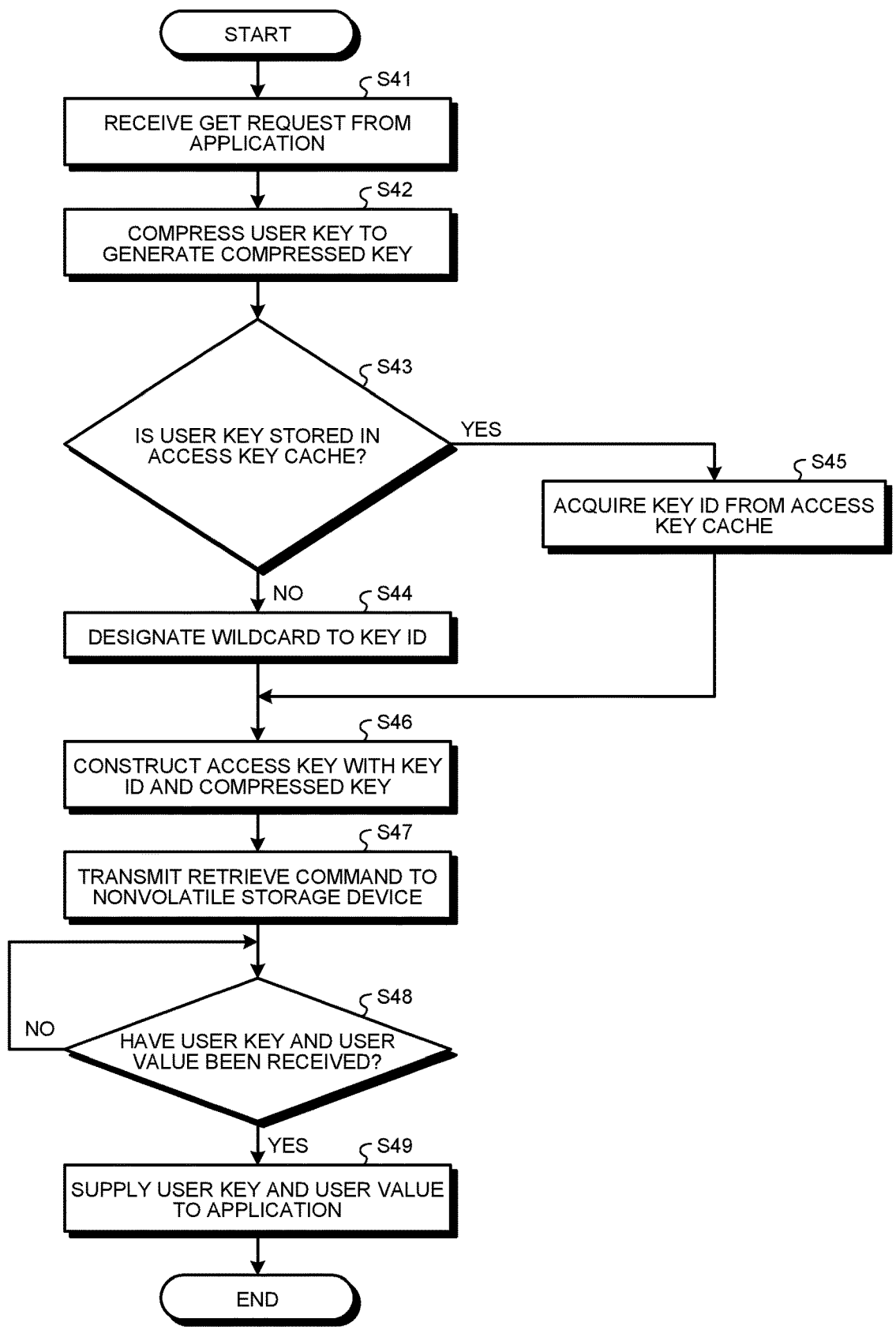
FIG. 16 is a flowchart illustrating operations of the host related to a retrieve command according to the embodiment.

Next, operations of the host 2 related to the retrieve command will be described with reference to FIG. 16. FIG. 16 is a flowchart illustrating operations of the host 2 related to the retrieve command. In the example of FIG. 16, the KV library 22 in the host 2 does not ensure that the user key 231 received from the nonvolatile storage device 100 matches the user key 231 requested by the application 23. Therefore, it is ensured that appropriate data is to be read in processing of confirming whether matching the request by the application 23, scheduling of the request, and the like.

In host 2, when having received a GET request from the application 23 (S41), KV library 22 extracts the user key 231 from the GET request, and generates the compressed key 231a using the compression algorithm set in S3 (S42). The KV library 22 determines whether the user key 231 included in the GET request in S41 is stored in the user key column 702 of the access key cache 22a (S43).

When the user key 231 is not stored in the user key column 702 of the access key cache 22a (No in S43), the KV library 22 designates a wildcard key ID for the key ID 118 (S44).

When the user key 231 is stored in the user key column 702 of the access key cache 22a (Yes in S43), the KV library 22 reads the cache entry 222 from the access key cache 22a and acquires the key ID 118 included in the cache entry 222 (S45).

KV library 22 constructs access key 117 using the key ID 118 designated in S44 or S45 and the compressed key 231a generated in S42 (S46). The KV library 22 constructs a command field (refer to FIG. 4) of the retrieve command using the access key 117, and transmits the retrieve command to the nonvolatile storage device 100 via the operating system 21 (S47). That is, the operating system 21 enqueues the retrieve command to the I/O SQ 43, and transmits a notification of the enqueue to the nonvolatile storage device 100.

The KV library 22 waits until a key-value pair (User key 231, user value 232) is received from the nonvolatile storage device 100 via the operating system 21 (No in S48). When having received the key-value pair from the nonvolatile storage device 100 via the operating system 21 (Yes in S48), the KV library 22 supplies the key-value pair to the application 23 (S49).

Figure 17:
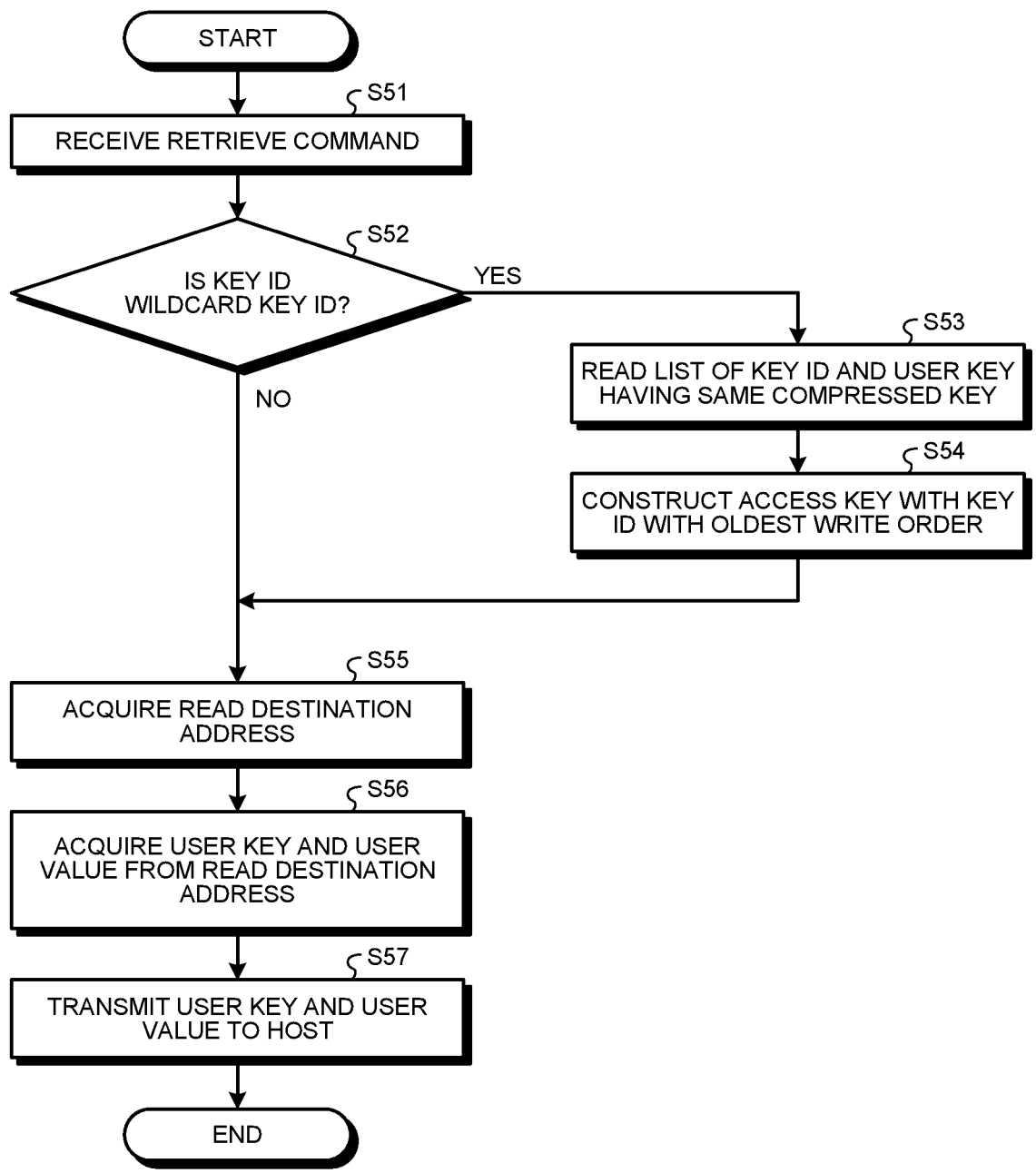
FIG. 17 is a flowchart illustrating operations of the nonvolatile storage device related to the retrieve command according to the embodiment.

Next, operations of the nonvolatile storage device 100 related to the retrieve command will be described with reference to FIG. 17. FIG. 17 is a flowchart illustrating operations of the nonvolatile storage device 100 related to the retrieve command.

In the nonvolatile storage device 100, when having received a retrieve command from the host 2 (S51), the controller 110 determines whether the key ID 118 is a wildcard key ID (S52). The controller 110 extracts the key ID 118 from the first half (refer to FIG. 4) of the access key 117 obtained from the fields of the keys 302, 303, 308, and 309 of the retrieve command.

When the extracted key ID 118 is a wildcard key ID (Yes in S52), there is a possibility that the compressed key 231a included in the retrieve command is the compressed key 231a generated first among the plural compressed keys 231a having a possibility of collision in the future. Therefore, the controller 110 reads the key ID 118 having the same compressed key 231a as the compressed key 231a included in the retrieve command, from the column 802 of the access key map 113b2 (S53), and constructs the access key 117 with the key ID 118 having the oldest write order among the read key IDs (S54).

For example, when the compressed key 231a included in the retrieve command is "ZZZZ", there are two entries in which the compressed key 231a is "ZZZZ, which are entries "1132-3 and 1132-4, in the access key map 113b2 illustrated in FIG. 10. In the access key map 113b2, when the entries 1132 are listed in the order of write from the upper row to the lower row, the entry 1132-3 of the entries 1132-3 and 1132-4 is the oldest entry in the order of write, and the key ID "00" of the entry 1132-3 is the oldest key ID 118 in the order of write. The controller 110 constructs "00ZZZZ", which is a combination of key ID "00" and compressed key "ZZZZ", as the access key 117.

As illustrated in FIG. 17, when the extracted key ID 118 is not a wildcard key ID (No in S52), the controller 110 extracts the access key 117 from the retrieve command.

The controller 110 acquires the physical address of the read destination of the key-value pair based on the access key map 113b2 and the address translation map 900 (S55). The controller 110 refers to the access key map 113b2 and specifies a logical address corresponding to the access key 117 of the key-value pair. The controller 110 refers to the address translation map 900 and specifies a physical address corresponding to the specified logical address. The controller 110 sets the specified physical address as the physical address of the read destination.

The controller 110 issues a read instruction including the acquired physical address to the nonvolatile memory 130. With this operation, the nonvolatile memory 130 reads the key-value pair including the user key 231 and the user value 232 from the physical address in response to the read instruction (S56). The nonvolatile memory 130 transmits the read user key 231 and user value 232 to the controller 110. When having received the user key 231 and the user value 232 from the nonvolatile memory 130, the controller 110 transmits the user key 231 and the user value 232 to the host 2 (S57).

As described above, in the information processing system 1 according to the embodiment, the host 2 generates the compressed key obtained by compressing the user key, and includes the compressed key in the field of the key when the KV command is issued. This makes it possible to manage the user key having a variable length within the restriction of the key length that can be designated in the command field of the KV command, enabling transfer of data regardless of the restriction of the command field.

Furthermore, in the information processing system 1 according to the embodiment, when having received the KV command including the compressed key, the nonvolatile storage device 100 determines whether there is a collision of the compressed key with another compressed key for each namespace, and generates a key ID for identifying the user key before compression in a case of collision. With this operation, by constructing an access key including the key ID and the compressed key, it is possible to prevent collision of the compressed key.

In the information processing system 1 according to the embodiment, the nonvolatile storage device 100 transmits the key ID to the host 2. The host 2 generates an access key by using the key ID and the compressed key, and issues a KV command requesting data access to the nonvolatile storage device 100 by using the access key. This makes it possible to prevent collision of the compressed keys, exchange information in a limited field of the KV command and the CQE, and uniquely perform data access.

In addition, in the information processing system 1 according to the embodiment, the key ID is shared between the nonvolatile storage device 100 and the host 2 in order to uniquely access data, and the host 2 preferentially caches the key ID having the collision of the compressed key in the access key cache 22a. This makes it possible suppress the use amount of the host memory 4 in the host 2 and improve the tail latency at the time of read.

In the information processing system 1 according to the embodiment, the host 2 preferentially caches the key ID in the access key cache 22a when there is a collision of the compressed keys, and otherwise performs data access to the nonvolatile storage device 100 with the wildcard key ID. This makes it possible to significantly reduce the number of key IDs that need to be shared between the nonvolatile storage device 100 and the host 2, leading to improvement in the read performance and tail latency.

In the information processing system 1 according to the embodiment, the correspondence between the access key and the user key is managed by the nonvolatile storage device 100. This makes it possible to ensure the correspondence between the access key and the user key.

For example, it is assumed, in the information processing system, that the host and the nonvolatile storage device adopt an interface that handles data in a block format. In this case, when handling data in an object format having a variable data size and not structured, data translation between an object level and a block level is performed in the interface. This is likely to increase the overhead in the command processing and increase the command processing time.

In contrast, in the information processing system 1 according to the present embodiment, the host 2 and the nonvolatile storage device 100 adopt a key-value (KV) type interface which is one of object-level interfaces. This makes it possible to perform command processing without translation to a block level when handling data in an object format, facilitating reduction of command processing time. This can not only improve the I/O latency and the throughput but also reduce the resources required for the CPU and the memory on the host 2 side.

Alternatively, in the information processing system, it is assumed that the host and the nonvolatile storage device handle data based on a log-structured merge tree (LSM tree). In this case, only the highest level among the multi-level hierarchical structure of the LSM tree is stored in the memory, making it possible to save memory usage. Many LSM tree implementations use a Bloom filter that stochastically skips some levels. The Bloom filter performs predetermined processing regardless of the number of bits, and thus, when the number of bits used per KV pair is small, the performance is also deteriorated. When the LSM tree is adopted on the key-value nonvolatile storage device with restricted resource, the number of bits used per KV pair is limited, having a possibility of a failure in acquiring sufficient performance.

In contrast, in the information processing system 1 according to the present embodiment, the host 2 and the nonvolatile storage device 100 handle a compressed key compressed by a compression algorithm such as hash calculation. Therefore, the processing time can be shortened according to a decrease in the number of bits used per KV pair, making it possible to suppress deterioration in performance.

Figure 18:
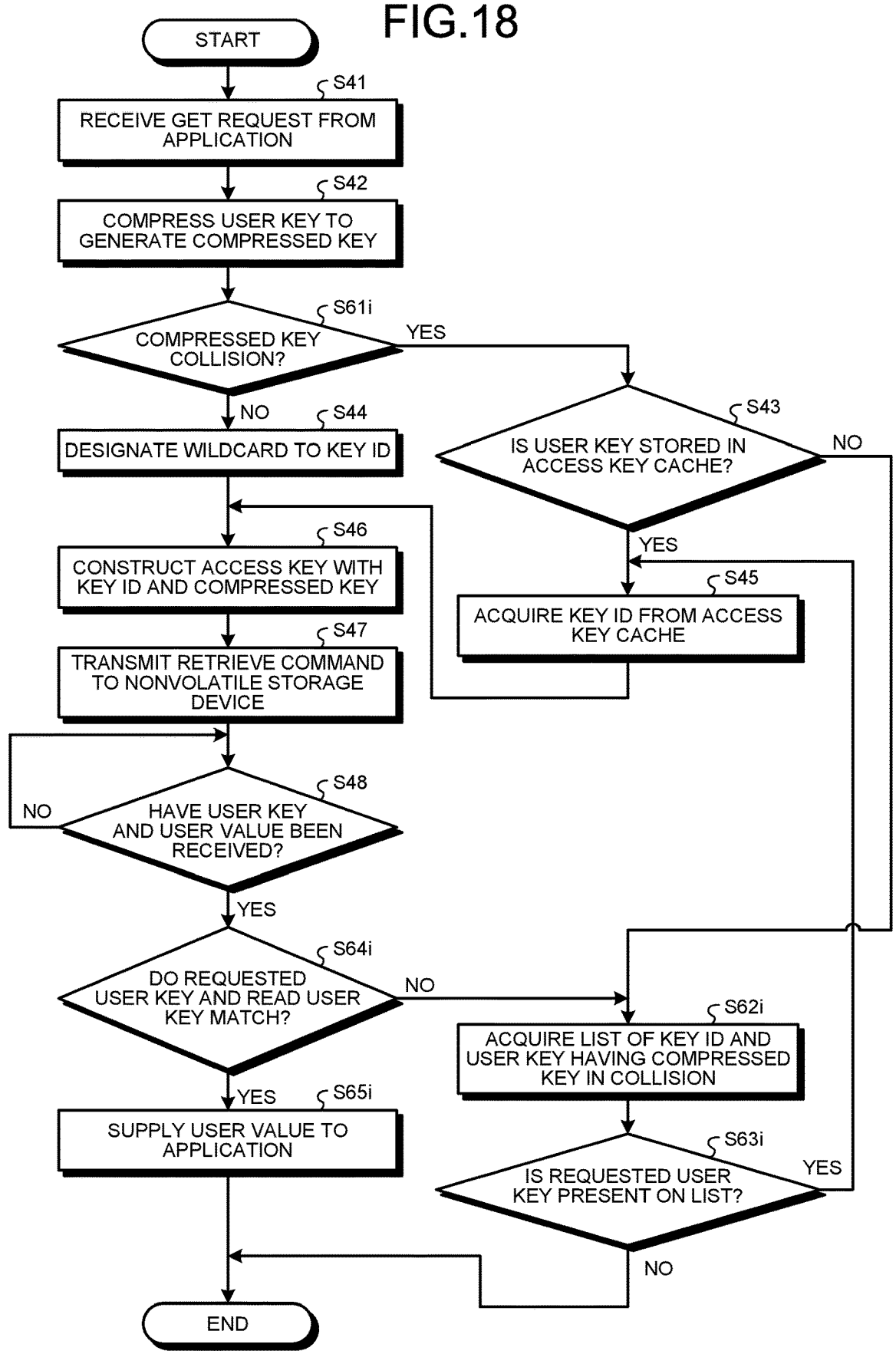
FIG. 18 is a flowchart illustrating operations of the host related to the retrieve command in a modification of the embodiment.

Furthermore, as a modification of the embodiment, as illustrated in FIG. 18, the KV library 22 may provide a function of ensuring that the user key 231 requested from the application 23 matches the user key 231 transmitted to the application 23 in response to the request. FIG. 18 is a flowchart illustrating operations of the host 2 related to the retrieve command in the modification of the embodiment.

Regarding the retrieve command, as illustrated in FIG. 18, processing different from that of the embodiment is performed in the following points.

In the host 2, the KV library 22 performs processing similar to S41 and 42 illustrated in FIG. 16 to determine whether a collision of the compressed key 231a has occurred (S61i). The KV library 22 manages each cache entry 222 of the access key cache 22a in association with the compressed key 231a. For example, when adding the cache entry 222 to the access key cache 22a, the KV library 22 may add management information in which an identifier of the cache entry and the compressed key 231a are associated with each other, to the access key cache 22a.

When there is the same compressed key as the compressed key 231a generated in S42 among the compressed keys 231a associated with each cache entry 222, the KV library 22 determines that a collision of the compressed keys 231a has occurred. When there is not the same compressed key as the compressed key 231a generated in S42 among the compressed keys 231a associated with each cache entry 222, the KV library 22 determines that a collision of the compressed keys 231a has not occurred.

When the collision of compressed key 231a has not occurred (No in S61i), processing similar to S44 and S46 to S48 illustrated in FIG. 16 is performed.

When the collision of the compressed key 231a has occurred (Yes in S61i), the KV library 22 determines whether the user key 231 included in the GET request in S41 is stored in the column 702 of the user key in the access key cache 22a (S43).

When the user key 231 is stored in the user key column 702 of the access key cache 22a (Yes in S43), the KV library 22 reads the cache entry 222 from the access key cache 22a and acquires the key ID 118 included in the cache entry 222 (S45).

When the user key 231 is not stored in the column 702 of the user key in the access key cache 22a (No in S43), the KV library 22 acquires a list of the key ID 118 and the user key 231 having a collision of the compressed key 231a (S62i). The KV library 22 receives the list in the buffer region 45. The KV library 22 scans the fields of the received list to determine whether the user key 231 requested in S41 is present on the list (S63i).

When the user key 231 requested in S41 does not exist in the list (No in S63i), the KV library 22 ends the processing as an error.

When the user key 231 requested in S41 is present in the list (Yes in S63i), the KV library 22 extracts the key ID 118 and the user key 231 corresponding to the same compressed key 231a as the compressed key 231a generated in S42. The KV library 22 constructs the cache entry 222 with the acquired set of the key ID 118 and the user key 231 and adds the cache entry 222 to the access key cache 22a. Thereafter, processing similar to S45 to S48 illustrated in FIG. 16 is performed.

When having received the key-value pair from the nonvolatile storage device 100 via the operating system 21 (Yes in S48), the KV library 22 determines whether the user key 231 requested in S41 matches the user key 231 received in S48 (S64i).

When the user key 231 requested in S41 does not match the user key 231 received in S48 (No in S64i), the KV library 22 returns the processing to S62i. That is, the loop processing from S61i to S64i is repeated until the user key 231 requested in S41 matches the user key 231 received in S48.

When the user key 231 requested in S41 matches the user key 231 received in S48 (Yes in S64i), the KV library 22 supplies the user value 232 to the application 23 (S64i). At this time, the KV library 22 need not supply the user key 231 to the application 23.

In this manner, in the modification of the embodiment, the KV library 22 in the host 2 repeats the loop processing from S61i to S64i until the user key 231 requested in S41 matches the user key 231 received in S48. This makes it possible to ensure that the user key 231 requested to the application 23 matches with the user key 231 transmitted to the application in response to the request.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonvolatile storage device comprising:
   a storage medium configured to store a key-value pair in which a key and a value form a pair; and
   a controller configured to generate identification information identifying the key and transmit the identification information to a host,
   wherein when a first compressed key in which the key is compressed matches a second compressed key, the controller is configured to generate identification information regarding the key corresponding to the first compressed key, the identification information regarding the key corresponding to the first compressed key being different from identification information regarding a key corresponding to the second compressed key, and
   the controller is configured to receive a command having a first field and a second field from the host, the first field having a fixed length and including at least the first compressed key, the second field having a variable length and including a key and a value corresponding to the first compressed key.

2. The nonvolatile storage device according to claim 1, wherein the first field corresponds to a size of a general-purpose register in a CPU.

3. The nonvolatile storage device according to claim 1, wherein the first field includes the identification information regarding the key corresponding to the first compressed key.

4. The nonvolatile storage device according to claim 1, wherein, in response to reception of the command including the first compressed key, the controller is further configured to determine whether the first compressed key matches the second compressed key, and in a case where the first compressed key matches the second compressed key, the controller is further configured to generate identification information corresponding to the first compressed key with information different from identification information corresponding to the second compressed key.

5. The nonvolatile storage device according to claim 4, wherein the controller includes an access key map, the access key map being a map where an access key and a logical address are associated with each other for plural access keys, the access key including identification information corresponding to a key included in a command and a compressed key, the logical address corresponding to a value included in the command, and the controller is further configured to determine whether the first compressed key matches the second compressed key with reference to the access key map.

6. The nonvolatile storage device according to claim 1, wherein the controller is further configured to:

determine whether the first compressed key matches the second compressed key, and when the first compressed key matches the second compressed key, notify the host of a flag indicating the match.

7. The nonvolatile storage device according to claim 6, wherein the storage medium is logically divided into plural namespaces, and the controller is further configured to determine whether the first compressed key matches the second compressed key for each of the namespaces.

8. The nonvolatile storage device according to claim 1, wherein the controller is further configured to:

in response to receiving, from the host, the command, execute the command and determine whether the first compressed key matches the second compressed key, and in a case where the first compressed key matches the second compressed key, notify the host of a flag indicating the match in response to completion of execution of the command, in a state where the flag is included in a completion notification of the command.

9. The nonvolatile storage device according to claim 1, wherein the controller is further configured to transmit and receive a signal conforming to a Non-Volatile Memory express (NVMe) standard to and from the host.

10. The nonvolatile storage device according to claim 9, wherein the controller is further configured to receive a store command having a third field and a fourth field from the host, the third field having a fixed length and including at least the first compressed key, the fourth field having a variable length and including a key and a value corresponding to the first compressed key.

11. The nonvolatile storage device according to claim 10, wherein the controller is further configured to:

in response to reception of the store command, execute the store command and determine whether the first compressed key matches the second compressed key, and in a case where the first compressed key matches the second compressed key, transmit, to the host, a completion queue entry including a flag indicating the match in response to completion of execution of the store command.

12. The nonvolatile storage device according to claim 11, wherein the storage medium is logically divided into plural namespaces, and the controller is further configured to determine whether the first compressed key matches the second compressed key for each of the namespaces.

13. A host capable of connecting to a nonvolatile storage device comprising a controller configured to:

compress a key in a key-value pair in which the key and a value are paired to generate a compressed key;

generate a first command set including a first command having a first field and a second field, the first field having a fixed length and including the compressed key, the second field having a variable length and including the key and the value;

transmit, to the nonvolatile storage device, the generated first command; and receive, from the nonvolatile storage device, identification information identifying the key and a flag indicating matching, when the compressed key matches a second compressed key.

14. The host according to claim 13, wherein the controller is configured to:

add an entry including the identification information corresponding to the compressed key and including the key to a cache in response to the flag, acquire the identification information from the cache, and generate, as one of the first command set, a second command in which the acquired identification information and compressed key are included in the first field while the key and the value are included in the second field.

15. The host according to claim 14, wherein the controller is further configured to:

in a case where generation of a command corresponding to the key is requested and the identification information corresponding to the key is cached, acquire the identification information corresponding to the key from the cache, and generate, as one of the first command set, a third command in which the acquired identification information and the compressed key are included in the first field, and in a case where generation of the command corresponding to the key is requested and the identification information corresponding to the key is not cached, generate, as one of the first command set, a fourth command in which a wildcard identification information indicating certain identification information and the compressed key are included in the first field while the key and the value are included in the second field.

16. The host according to claim 15, wherein the controller is further configured to:

receive, from the nonvolatile storage device, a completion notification of the third command or the fourth command including the key, and repeat generation of the third command or the fourth command until the requested key and the received key match.

17. A control method of controlling a nonvolatile storage device, the control method comprising;

acquiring a first compressed key in which a key is compressed;

determining whether the acquired first compressed key matches a second compressed key;

generating identification information identifying a key corresponding to the acquired first compressed key in a case where the acquired first compressed key matches the second compressed key; and transmitting the generated identification information to a host, wherein the generation of the identification information includes performing, in the case where the acquired first compressed key matches the second compressed key, generation of identification information for the acquired first compressed key which is different from identification information for a key corresponding to the second compressed key, and the acquiring includes receiving a command having a first field and a second field from the host, the first field having a fixed length and including at least the first compressed key, the second field having a variable length and including a key and a value corresponding to the first compressed key.

18. The control method according to claim 17, the method further comprising:
    in response to reception of the command including the first compressed key, determining whether the first compressed key matches the second compressed key; and
    in response to determining that the first compressed key matches the second compressed key, generating identification information corresponding to the first compressed key with information different from identification information corresponding to the second compressed key.

19. The control method according to claim 17, the method further comprising:

determining whether the first compressed key matches the second compressed key; and
    in response to determining that the first compressed key matches the second compressed key, notifying the host of a flag indicating the match.

20. The control method according to claim 17, the method further comprising:
    in response to receiving, from the host, the command, executing the command and determining whether the first compressed key matches the second compressed key, and
    in response to determining that the first compressed key matches the second compressed key, notifying the host of a flag indicating the match in response to completion of execution of the command, in a state where the flag is included in a completion notification of the command.

* * * * *